(12) United States Patent
Kawamoto et al.

(10) Patent No.: US 10,222,613 B2
(45) Date of Patent: Mar. 5, 2019

(54) DISPLAY APPARATUS FOR A VEHICLE

(71) Applicant: TOYOTA JIDOSHA KABUSHIKI KAISHA, Toyota-shi, Aichi-ken (JP)

(72) Inventors: Masashi Kawamoto, Okazaki (JP); Takayuki Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 15/730,170

(22) Filed: Oct. 11, 2017

(65) Prior Publication Data

US 2018/0157034 A1    Jun. 7, 2018

(30) Foreign Application Priority Data

Dec. 7, 2016  (JP) ................. 2016-237897

(51) Int. Cl.
| | | |
|---|---|---|
| *G02B 27/01* | (2006.01) | |
| *B60N 2/02* | (2006.01) | |
| *B60R 16/02* | (2006.01) | |
| *B62D 1/181* | (2006.01) | |
| *B62D 1/187* | (2006.01) | |
| *B60K 35/00* | (2006.01) | |

(52) U.S. Cl.
CPC .............. *G02B 27/01* (2013.01); *B60K 35/00* (2013.01); *B60N 2/02* (2013.01); *B60R 16/02* (2013.01); *B62D 1/181* (2013.01); *B62D 1/187* (2013.01); *B60K 2350/967* (2013.01); *B60R 2300/80* (2013.01)

(58) Field of Classification Search
CPC .. G02B 27/01; B60K 35/00; B60K 2350/106; B60K 2350/352; B60K 2350/925; B60K 2350/967; B60K 2350/2013; B60K 2350/1068; B60N 2/02; B60R 16/02; B60R 2300/80; B62D 1/181; B62D 1/187
See application file for complete search history.

(56) References Cited

U.S. PATENT DOCUMENTS

| | | | |
|---|---|---|---|
| 8,013,723 B2* | 9/2011 | Kawachi ................ | B60K 35/00 340/435 |
| 9,637,002 B1* | 5/2017 | Boss ....................... | B60K 35/00 |
| 2016/0121805 A1* | 5/2016 | Forsgren ............. | B60R 11/0235 348/837 |
| 2016/0311323 A1* | 10/2016 | Lee ........................ | B60K 37/06 |
| 2018/0011551 A1* | 1/2018 | Gothlin .................. | B60K 37/04 |
| 2018/0029501 A1* | 2/2018 | Wolf ........................ | B60N 2/06 |
| 2018/0037248 A1* | 2/2018 | Schwarz .................. | B62D 1/04 |

(Continued)

FOREIGN PATENT DOCUMENTS

JP    2016-168972 A    9/2016

*Primary Examiner* — Tom V Sheng

(74) *Attorney, Agent, or Firm* — Oliff PLC

(57) ABSTRACT

A display apparatus for a vehicle is provided with a display unit and a display position control unit. The display unit is capable of displaying information at plural different display positions. In an autonomous driving state of the vehicle, the display position control unit detects a position of a steering wheel and an eye position of a driver. When the display position control unit determines that information displayed by the display unit is obscured by the steering wheel as seen by the driver, the display position control unit causes the information to be displayed at a display position that is visible to the driver.

8 Claims, 10 Drawing Sheets

(56) References Cited

U.S. PATENT DOCUMENTS

2018/0074497 A1* 3/2018 Tsuji .................. G06K 9/00288
2018/0086297 A1* 3/2018 Bodtker ................ B60K 35/00
2018/0105186 A1* 4/2018 Motomura ............ B60W 50/14

* cited by examiner

DISPLAY APPARATUS FOR A VEHICLE

CROSS-REFERENCE TO RELATED APPLICATION

This application claims priority under 35 USC 119 from Japanese Patent Application No. 2016-237897 filed Dec. 7, 2016, the disclosure of which is incorporated by reference herein.

BACKGROUND

Technical Field

The present invention relates to a display apparatus for a vehicle.

Related Art

When a vehicle has been switched from manual driving to autonomous driving, a seatback may be tilted manually or automatically into an attitude in which a driver may relax (see Japanese Patent Application Laid-Open (JP-A) No. 2016-168972).

When a driver is in a relaxed posture, the driver's eyeline is lower and displayed information such as a running speed and the like may be obscured by a steering wheel. Accordingly, making displayed information visible by lowering the steering wheel has been considered. However, if a steering wheel is lowered, a gap between the steering wheel and the driver's legs is reduced.

SUMMARY

The present invention provides a display apparatus for a vehicle that may both assure a gap between a steering wheel and a driver's legs and assure visibility of displayed information.

A display apparatus for a vehicle according to a first aspect of the present invention includes: a display unit capable of displaying information at a plurality of different display positions; and a display position control unit that, in an autonomous driving state of the vehicle, detects a position of a steering wheel and an eye position of a driver, and when the display position control unit determines that information displayed by the display unit is obscured by the steering wheel as seen by the driver, causes the information to be displayed at a display position that is visible to the driver.

According to the first aspect, in the autonomous driving state of the vehicle, the display position control unit detects a position of the steering wheel and detects an eye position of a driver. If it is determined that information displayed by the display unit is obscured by the steering wheel as seen by the driver, the display position control unit causes the information to be displayed at a display position that is visible to the user.

Therefore, visibility of the displayed information may be assured. Because the visibility is assured by altering the display position at which the information is displayed, there is no need to lower the steering wheel. Thus, a gap between the steering wheel and the driver's legs may be assured.

Thus, according to the first aspect, both assurance of the gap between the steering wheel and the driver's legs and assurance of the visibility of the displayed information may be achieved.

The meaning of the term "display unit" encompasses at least: a display unit that is capable of display at plural display screens disposed at different positions; and a display unit that is capable of display at plural different display positions in one display screen. The meaning of "a display unit that is capable of display at plural different display positions in one display screen" encompasses at least: a display unit that is capable of display at plural pre-specified display positions in the one display screen; and a display unit that is capable of display at any position in the one display screen, with a display position being freely alterable within the one display screen. Moreover, states in which information displayed by the display unit is obscured by the steering wheel as seen by the driver include cases in which a portion of information displayed in a display region is obscured by the steering wheel as seen by the driver.

In a display apparatus for a vehicle according to a second aspect of the present invention, when the display position control unit determines that information displayed at a display position that is at the vehicle front side relative to the steering wheel is obscured by the steering wheel as seen by the driver, the display position control unit causes the information to be displayed at a display position that is at a vehicle width direction inner side or outer side relative to the steering wheel as seen by the driver.

According to the second aspect, when it is determined that information displayed at the display position that is at the vehicle front side relative to the steering wheel is obscured by the steering wheel as seen by the driver, the display position control unit causes the information to be displayed at the display position that is at the vehicle width direction inner side or outer side relative to the steering wheel as seen by the driver.

Thus, because the information is displayed at a display position that is at the vehicle width direction inner side or outer side relative to the steering wheel as seen by the driver, even if the position of the driver's eyeline changes in the vertical direction while the information is displayed at this display position, the displayed information is unlikely to be obscured by the steering wheel. Therefore, visibility of the displayed information may be continuously assured.

In a display apparatus for a vehicle according to a third aspect of the present invention, when the display position control unit determines that information displayed at a display position that displays via a space inside the steering wheel is obscured by the steering wheel as seen by the driver, the display position control unit causes the information to be displayed at another display position that is disposed at the vehicle upper side relative to the display position and that is visible to the driver via the space.

According to the third aspect, when information is displayed at the display position that displays through the space at the inside of the steering wheel but it is determined that the information is obscured by the steering wheel as seen by the driver, the information is displayed at the display position that is disposed at the vehicle upper side relative to that display position and that is visible to the driver through the space.

Thus, the display position at which the information is displayed after this alteration, when it has been determined that the displayed information would be obscured by the steering wheel, is disposed at the vehicle upper side relative to the display position before the alteration. Therefore, the display position before the alteration and the display position after the alteration may be specified within a small range in the vehicle width direction.

BRIEF DESCRIPTION OF THE DRAWINGS

Exemplary Embodiments of the present invention will be described in detail based on the following figures, wherein.

DETAILED DESCRIPTION

Figure 1:
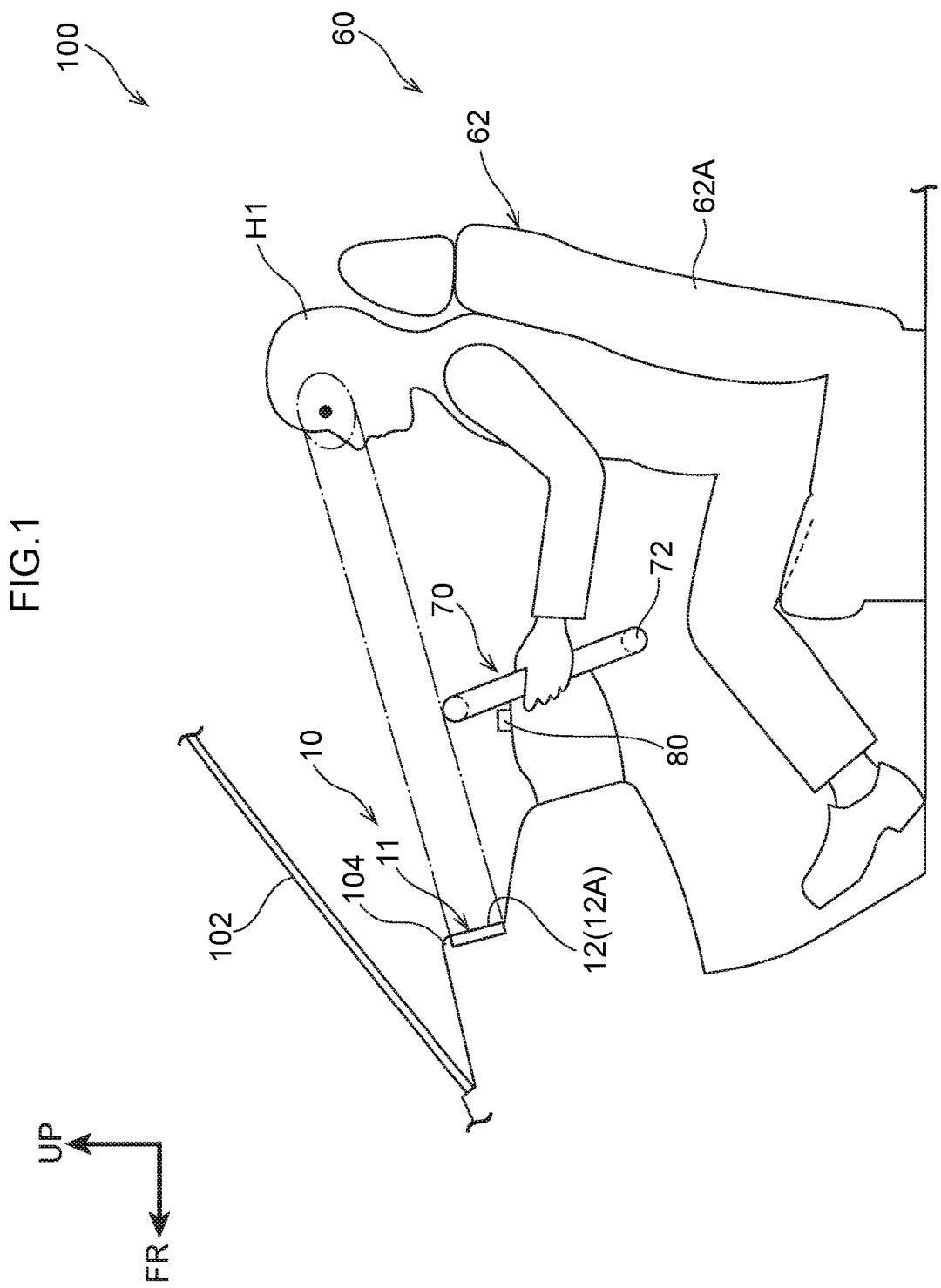
FIG. 1 is a schematic side view showing the vehicle interior of a vehicle in which a display apparatus for a vehicle according to a first exemplary embodiment is employed.

Herebelow, examples of embodiments relating to the present invention are described in accordance with the drawings. An arrow FR, an arrow UP and an arrow IN that are shown where appropriate in the drawings indicate, respectively, a vehicle front side, a vehicle upper side and a vehicle width direction inner side. In the descriptions below, the front-and-rear direction of the vehicle and the vertical direction of the vehicle may simply be referred to as, respectively, front and rear and up and down.

First Exemplary Embodiment

Vehicle 100

First, a vehicle 100 is described, in which a display apparatus for a vehicle 10 according to the first exemplary embodiment is employed. FIG. 1 is a schematic side view showing the vehicle interior of the vehicle 100.

Figure 2:
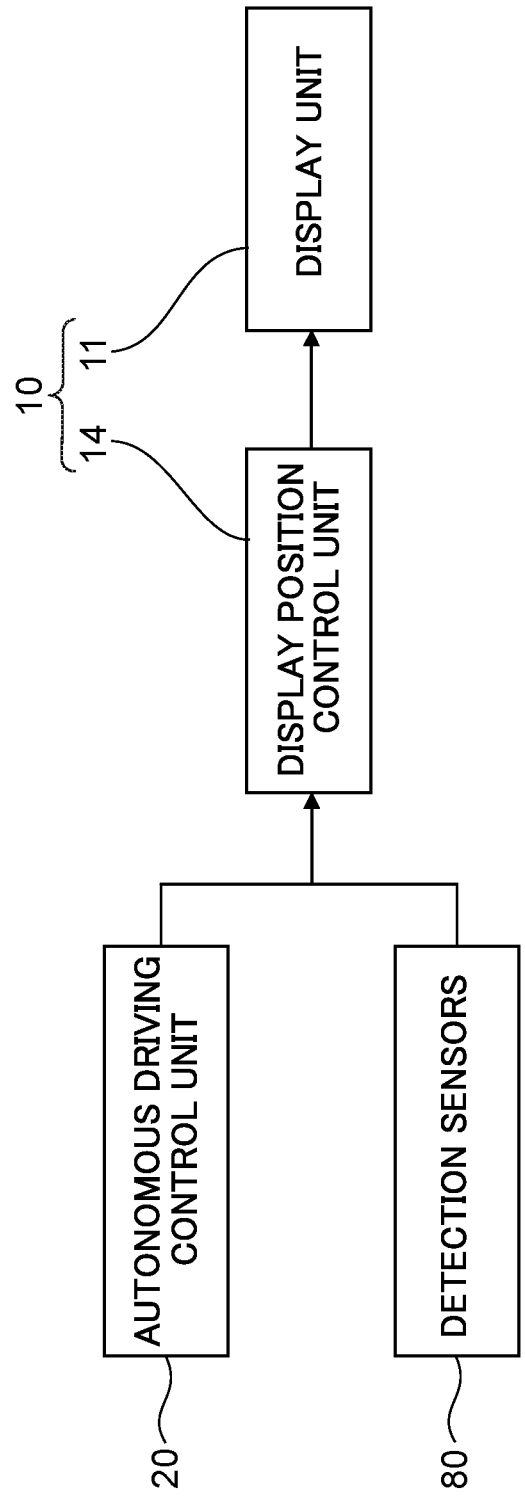
FIG. 2 is a block diagram showing a control system including a display position control unit of the display apparatus for a vehicle according to the first exemplary embodiment.

As shown in FIG. 1, the vehicle 100 is equipped with a seat apparatus 60 including a vehicle seat 62 (a driving seat), a steering apparatus 70 including a steering wheel 72, position detection sensors 80, the display apparatus for a vehicle 10, and an autonomous driving control unit 20 (see FIG. 2).

The seat apparatus 60 features a reclining function that makes an angle of a seatback 62A of the vehicle seat 62 adjustable. Accordingly, the angle of the seatback 62A may be adjusted by operations by a driver. This angle adjustment encompasses at least one of: electrical adjustment of the angle of the seatback 62A in response to a driver operating an operation unit such as an operation switch or the like; and adjustment of the angle of the seatback 62A by a driver manually operating an operation unit such as an operation lever or the like and the seatback 62A.

The steering apparatus 70 features a tilt function that makes a height (angle) of the steering wheel 72 adjustable and a telescopic function that makes a position of the steering wheel 72 in the front-and-rear direction adjustable. Accordingly, the position of the steering wheel 72 in the vertical direction and the front-and-rear direction may be adjusted by operations by a driver. This position adjustment encompasses at least one of: electrical adjustment of the position of the steering wheel 72 in response to a driver operating an operation unit such as an operation switch or the like; and adjustment of the position of the steering wheel 72 by a driver manually operating an operation unit such as an operation lever or the like and the steering wheel 72.

The autonomous driving control unit 20 (see FIG. 2) controls switching between an autonomous driving state and a manual driving state. In the autonomous driving state, conditions in the vicinity of the vehicle and running states are determined and autonomous driving of the vehicle is implemented. In the manual driving state, a driver carries out manual driving. As an example, the autonomous driving control unit 20 switches between the autonomous driving state and the manual driving state in response to the driver operating an operation unit such as an operation switch or the like.

In the autonomous driving state, for independent running of the vehicle, the autonomous driving control unit 20 judges conditions in the vicinity of the vehicle and running states on the basis of information obtained from various sensors, and executes autonomous driving control processing to control acceleration amounts, braking amounts, steering angles and the like. As shown in FIG. 2, the autonomous driving control unit 20 is connected to a display position control unit 14 of the display apparatus for a vehicle 10. The autonomous driving control unit 20 inputs information on whether a running operation state of the vehicle 100 is the autonomous driving state or the manual driving state to the display position control unit 14.

Figure 4:
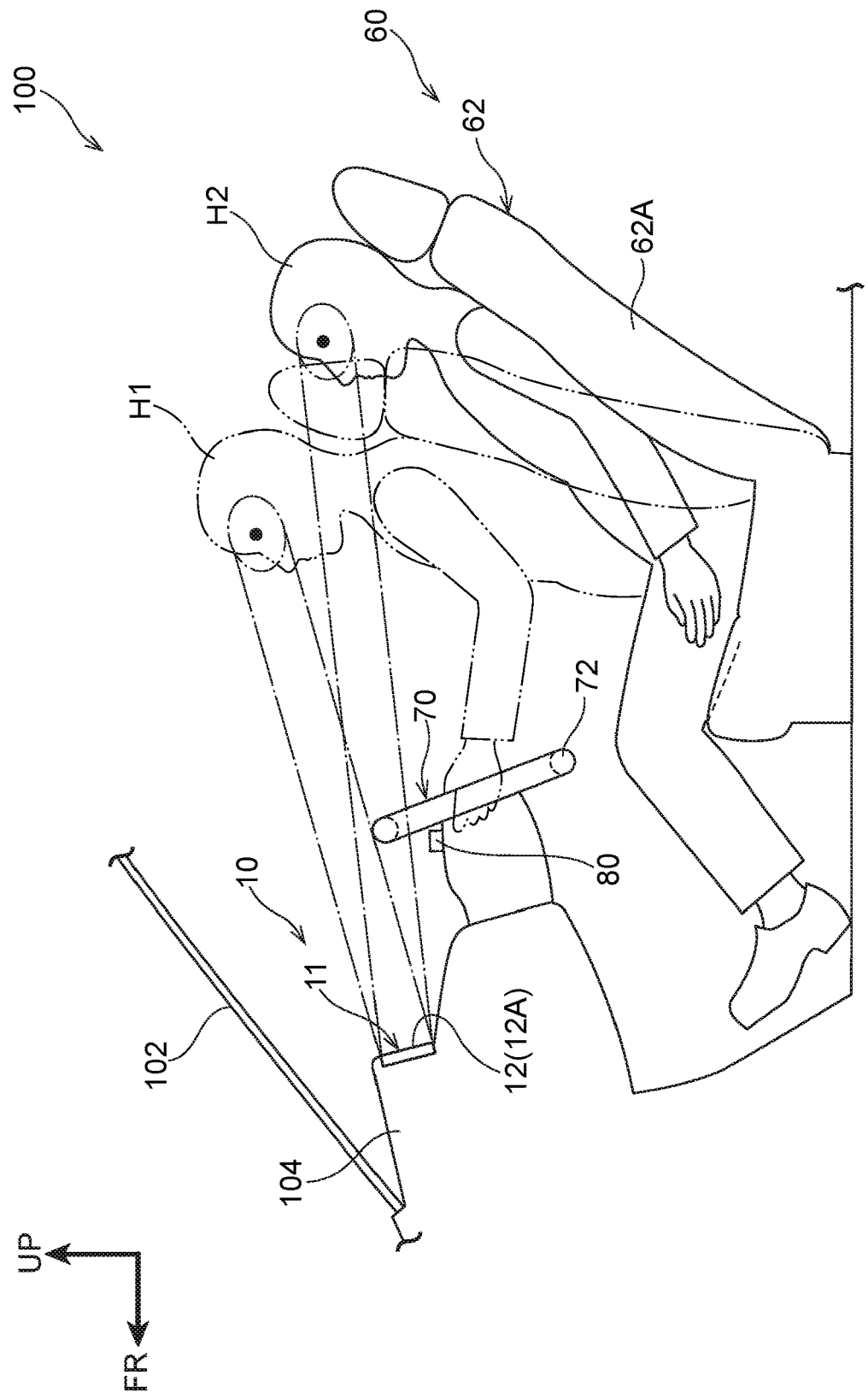
FIG. 4 is a schematic side view showing the structures shown in FIG. 1 when a driver has changed to a relaxed posture in an autonomous driving state.

In the autonomous driving state, the angle of the seatback 62A is adjusted by operation by a driver and, as shown in FIG. 4, the driver may change the seatback 62A from a driving posture for the manual driving state to a relaxed posture (a reclining posture). Herebelow, the driver in the driving posture for the manual driving state is referred to as "the driver H1", and the driver in the relaxed posture for the autonomous driving state is referred to as "the driver H2".

As shown in FIG. 2, the display apparatus for a vehicle 10 includes a display unit 11 and the display position control unit 14. The display unit 11 is formed with a display 12 (see FIG. 1 and FIG. 3). The display 12 is a display screen that displays information of gauges of running speed, remaining fuel and like and information of warnings of unfastened seat belts, partly open doors and the like. Herebelow, information that is an object to be displayed at the display 12 is referred to as "the object information".

Figure 3:
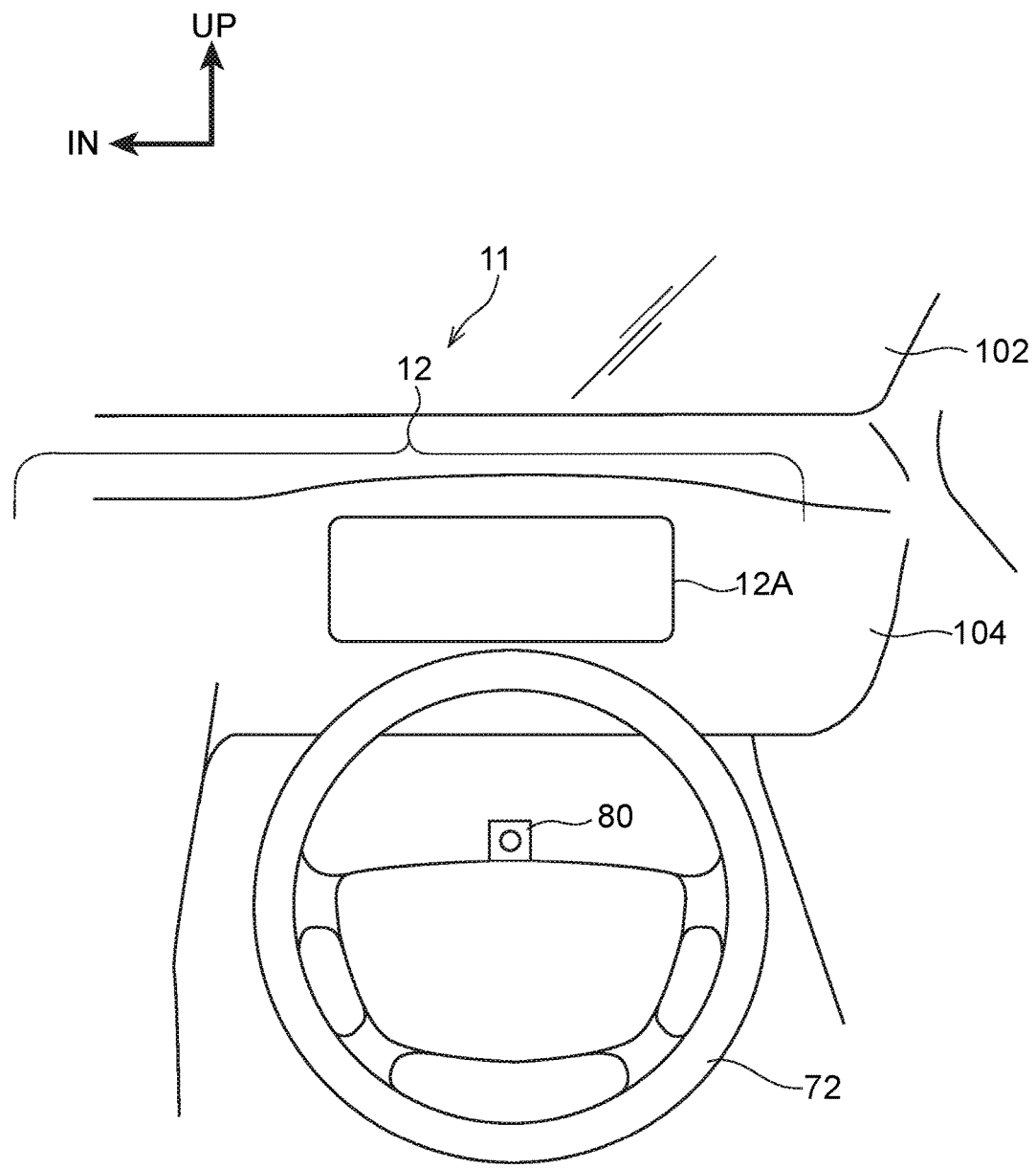
FIG. 3 is a diagram showing structures of a vehicle front portion according to the first exemplary embodiment as seen by a driver in a driving posture in a manual driving state.
Figure 5:
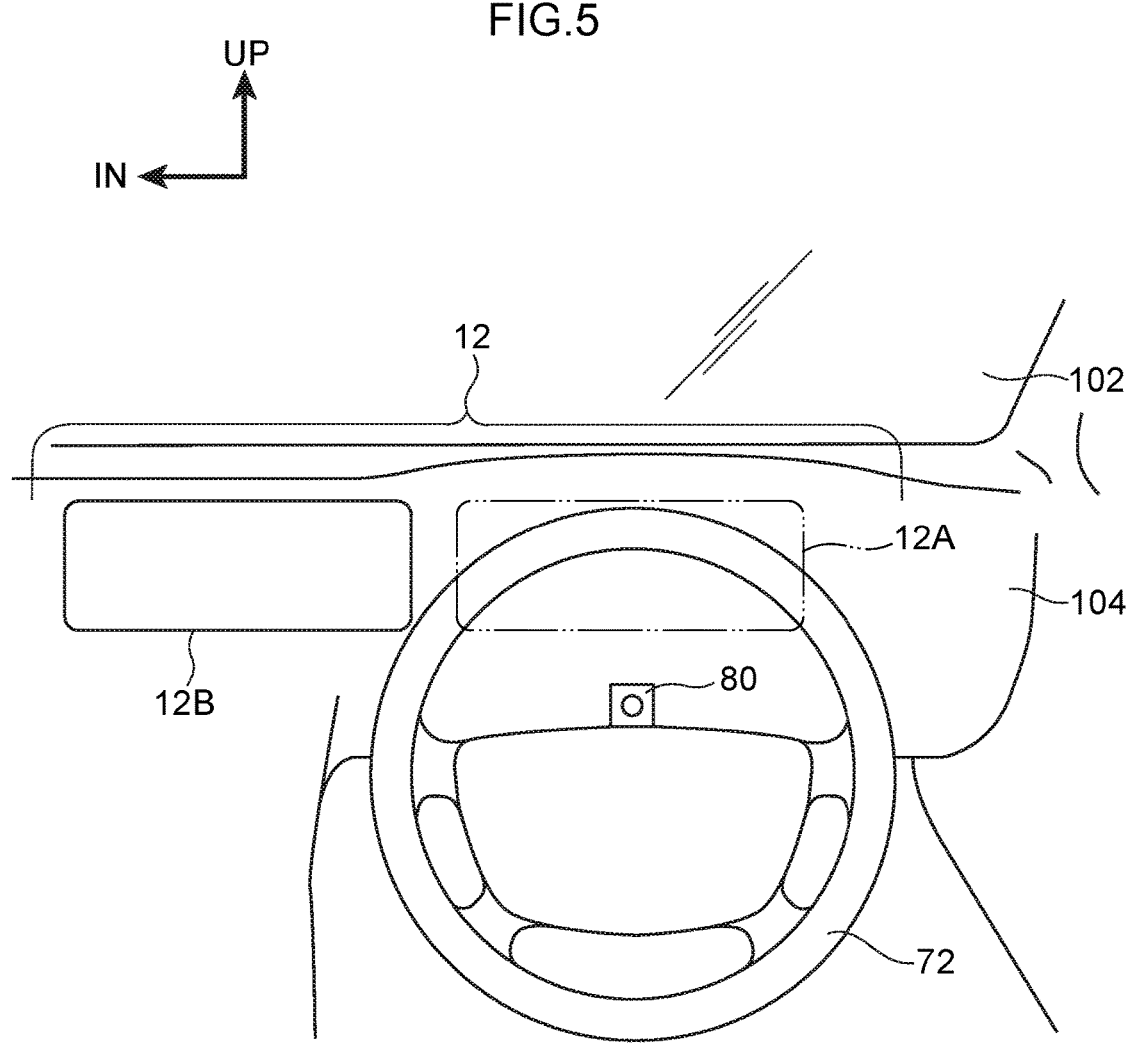
FIG. 5 is a diagram showing the structures of the vehicle front portion according to the first exemplary embodiment as seen by a driver in the relaxed posture in the autonomous driving state.

As shown in FIG. 1, the display 12 is disposed at an instrument panel 104 that is provided at the lower side of a front windshield glass 102. As shown in FIG. 3 and FIG. 5, a range (width) of the display 12 in the vehicle width direction is larger than a range (width) of the steering wheel 72 in the vehicle width direction. In specific terms, the display 12 is disposed in a range at least from a region at the front side relative to the steering wheel 72 to a region extending to a vehicle width direction inner side relative to the steering wheel 72.

The display 12 is capable of displaying the object information in a front side region 12A at the front side relative to the steering wheel 72 and an inner side region 12B at the vehicle width direction inner side (the left side in FIG. 5) relative to the front side region 12A and the steering wheel 72. That is, the display 12 includes the front side region 12A and the inner side region 12B as display regions that display object information.

As shown in FIG. 1, the front side region 12A displays the object information over the upper side of the steering wheel 72 to the driver H1 in the driving posture in the manual driving state. That is, as shown in FIG. 3, the front side region 12A is a display region that displays the object information at a display position at the upper side of the steering wheel 72 as seen by the driver H1. Therefore, the driver H1 can see the object information displayed at the front side region 12A from the upper side of the steering wheel 72.

As shown in FIG. 5, in specific terms, the inner side region 12B is a display region that displays the object information at a display position at the vehicle width direction inner side relative to the steering wheel 72 as seen by the driver H2 in the relaxed posture in the autonomous driving state (see FIG. 4). Therefore, the steering wheel 72 is not disposed between the object information displayed at the inner side region 12B and the eyeline of the driver H2. That is, the object information is displayed at the inner side region 12B at a display position that is visible to the driver H2 rather than being obscured by the steering wheel 72 as seen by the driver H2.

Even as seen by the driver H1, the inner side region 12B is not obscured by the steering wheel 72; the inner side region 12B is a display region that displays the object information at a display position that is visible to the driver H1.

The display position control unit 14 features a function that controls the display position of the object information by switching the display region in which the object information is displayed between the front side region 12A and the inner side region 12B. The display position control unit 14 holds information on display positions of the object information displayed at the front side region 12A and the inner side region 12B.

As described above, the display position control unit 14 is connected with the autonomous driving control unit 20 as shown in FIG. 2; information on whether the running operation state of the vehicle 100 is the autonomous driving state or the manual driving state is inputted from the autonomous driving control unit 20. When the running operation state information of the vehicle 100 that is inputted from the autonomous driving control unit 20 represents the manual driving state, the display position control unit 14 displays the object information in the front side region 12A. During manual driving, when the driver H1 looks at the display region from a state in which the driver H1 is looking to the front of the vehicle through the front windshield glass 102, the front side region 12A can be seen with smaller movements of the eyeline than the inner side region 12B. Therefore, the front side region 12A is used as the display region in the manual driving state.

The position detection sensors 80 are sensors that detect positions of the steering wheel 72 and eye positions of drivers. Methods for detection of these positions by the position detection sensors 80 are not limited to particular methods; various detection methods may be employed.

As an example, a position of the steering wheel 72 may be detected by a position sensor detecting an angle and position of a steering shaft, and an eye position of a driver may be detected from an image obtained by imaging of the eyes (the face) of the driver by a camera.

In a configuration in which the position of the steering wheel 72 is adjusted electrically, the position of the steering wheel 72 may be detected on the basis of driving amounts of a motor or the like. In a configuration in which the angle of the seatback 62A is adjusted electrically, the angle of the seatback 62A may be detected on the basis of driving amounts of a motor or the like, the posture of a driver H2 with a standard physique may be estimated from this angle, and hence the eye position may be detected. The eye position of the driver may be a range of a distribution of eye positions of drivers with different physiques. That is, the eye position may be considered as being not a point but a particular range.

The position detection sensors 80 are connected to the display position control unit 14 and input the position information of the steering wheel 72 and the eye position information of the driver to the display position control unit 14.

Processing Sequence of the Display Position Control Unit 14 According to the First Exemplary Embodiment The present processing sequence is executed when the running operation state of the vehicle 100 goes into the autonomous driving state. That is, the display position control unit 14 executes the present processing sequence when the running operation state information of the vehicle 100 that is inputted from the autonomous driving control unit 20 represents the autonomous driving state.

When the information representing the autonomous driving state is inputted from the autonomous driving control unit 20, the display position control unit 14 acquires position information of the steering wheel 72 and eye position information of the driver H2 from the position detection sensors 80.

On the basis of display position information of the front side region 12A that is already known, the position information of the steering wheel 72 acquired from the position detection sensors 80, and the eye position information of the driver H2, the display position control unit 14 makes a determination as to whether the object information is obscured by the steering wheel 72 as seen by the driver H2. The display position control unit 14 determines that the object information is obscured by the steering wheel 72 even if only a portion of the object information is obscured by the steering wheel 72. The display position control unit 14 may determine that the object information is obscured by the steering wheel 72 if principal components of the object information (components that are vital to information transfer to the driver) are obscured.

Hence, if it is determined that the object information is obscured by the steering wheel 72, the display position control unit 14 switches the display region from the front side region 12A to the inner side region 12B. As a result, the object information is displayed at a display position that is visible to the driver H2.

If the display position control unit 14 determines that the object information is not obscured by the steering wheel 72, the display position control unit 14 keeps the display region at the front side region 12A.

Operational Effects According to the First Exemplary Embodiment

According to the display apparatus for a vehicle 10 as described above, when the display position control unit 14 determines that object information displayed at the front side region 12A is obscured by the steering wheel 72 as seen by the driver H2, the object information is caused to be displayed at the inner side region 12B that is disposed at a display position that is visible to the driver H2.

Therefore, visibility of the displayed object information may be assured. Because the visibility is assured by altering the display position at which the object information is displayed, there is no need to lower the steering wheel 72. Thus, a gap between the steering wheel 72 and the legs of the driver H2 may be assured.

Therefore, according to the configuration of the present exemplary embodiment, both assurance of the gap between the steering wheel 72 and the legs of the driver H2 and assurance of the visibility of displayed object information may be achieved.

Moreover, as described above, because the object information is displayed at the inner side region 12B that is at the vehicle width direction inner side relative to the steering wheel 72 as seen by the driver H2, even if the position of the eyeline of the driver H2 changes in the vertical direction while the object information is displayed at the inner side region 12B, the steering wheel 72 is unlikely to overlap with the inner side region 12B and the displayed object information is unlikely to be obscured by the steering wheel 72. Therefore, the visibility of the displayed information may be continuously assured.

Variant Examples of the First Exemplary Embodiment

In the first exemplary embodiment, when it is determined that the object information displayed at the front side region 12A is obscured by the steering wheel 72 as seen by the driver H2, the object information is caused to be displayed at the inner side region 12B that is at the vehicle width direction inner side relative to the steering wheel 72 as seen by the driver H2, but this is not limiting. For example, when it is determined that the object information displayed at the front side region 12A is obscured by the steering wheel 72 as seen by the driver H2, the object information may be caused to be displayed at an outer side region disposed at a display position that is at the vehicle width direction outer side relative to the steering wheel 72 as seen by the driver H2.

When it is determined that the displayed object information is obscured by the steering wheel 72, the display region at which the object information is displayed after the alteration of the display region is not limited to the inner side region 12B or the above-mentioned outer side region. It is sufficient that the display region be disposed at a display position that is visible to the driver H2. States in which the object information is visible to the driver H2 are ideally states in which the whole of the object information is visible, but may include states in which components of the object information other than principal components (i.e., components that do not contribute to information transfer to the driver) may not be visible. Further, states in which the object information is visible to the driver H2 may be understood as being states in which the object information is more visible than in states in which the object information is obscured by the steering wheel 72.

The first exemplary embodiment has a structure in which the object information is displayed at the display 12 that is disposed at the instrument panel 104, but this is not limiting. For example, the display may be a head-up display that displays virtual gauges on the front windshield glass 102. In this case, the head-up display may have a configuration such that display regions include, for example, a front side region and an inner side region.

The display unit 11 is not limited to a display unit that displays at pre-specified display positions of the display 12. The display unit 11 may be a display unit that is capable of display at any position of the display 12, with the display position in the display 12 being freely alterable. In this display unit, when it is determined that the displayed object information is obscured by the steering wheel 72, the display position (display region) at which the object information is displayed after the alteration may be specified at each time of this determination. That is, a configuration is possible in which the display position (display region) after the alteration is modified at each occasion of the determination (a modifiable configuration).

The display unit 11 may be a display unit that is structured with plural displays (display screens) disposed at different positions and that is capable of displaying object information at each display. In this case, one display is, for example, a structure including the front side region 12A that is a display region disposed at the front side relative to the steering wheel 72, at a position at the upper side of the steering wheel 72 as seen by the driver H1. Another display is, for example, a structure including the inner side region 12B that is a display region disposed at a position at the vehicle width direction inner side relative to the steering wheel 72 as seen by the driver H2.

Second Exemplary Embodiment

Now, a display apparatus for a vehicle 200 according to a second exemplary embodiment is described. Portions that have the same functions as in the first exemplary embodiment described above are assigned the same reference numerals as appropriate and descriptions thereof are omitted as appropriate.

Figure 6:
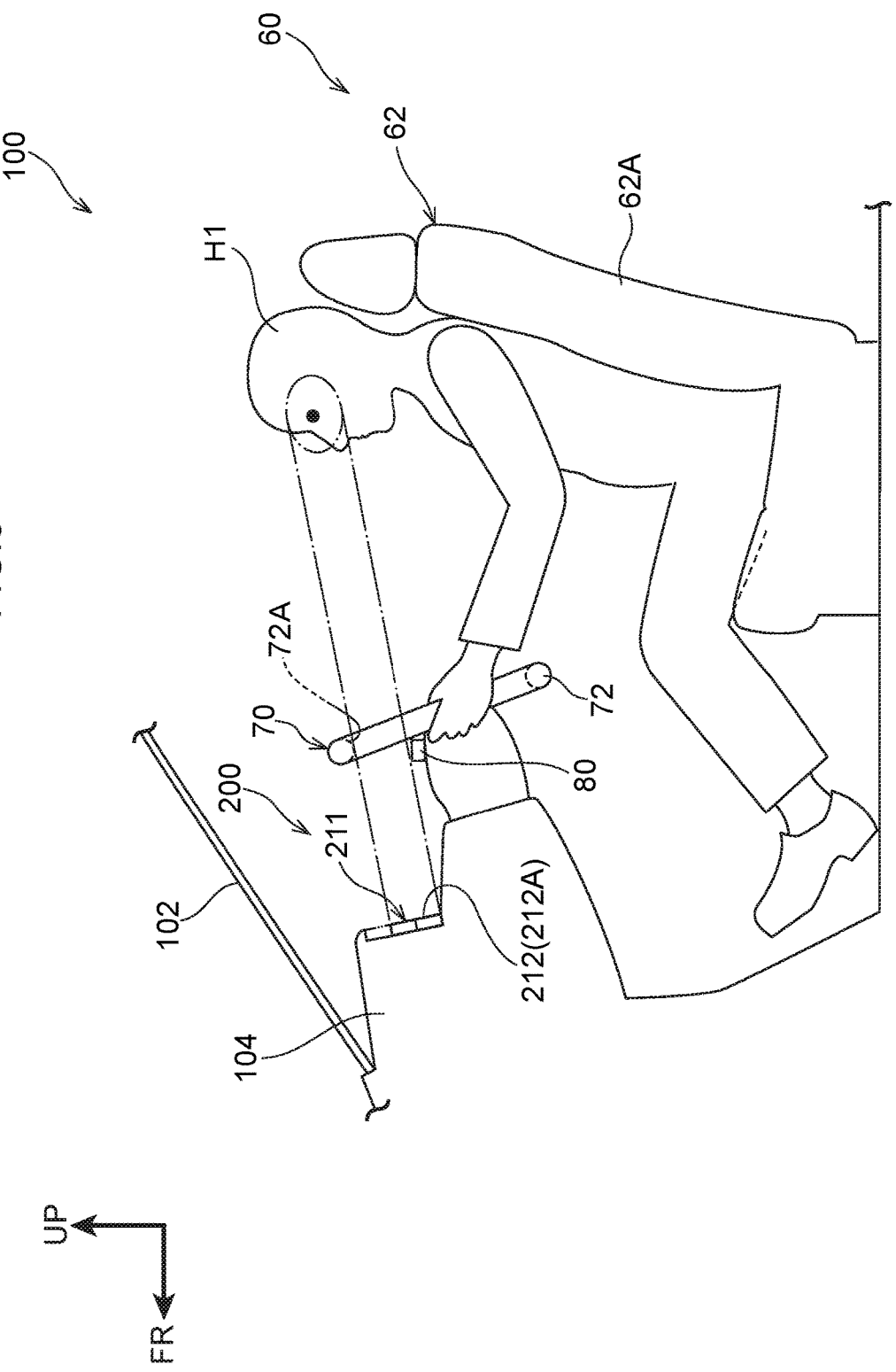
FIG. 6 is a schematic side view showing the vehicle interior of a vehicle in which a display apparatus for a vehicle according to a second exemplary embodiment is employed.
Figure 7:
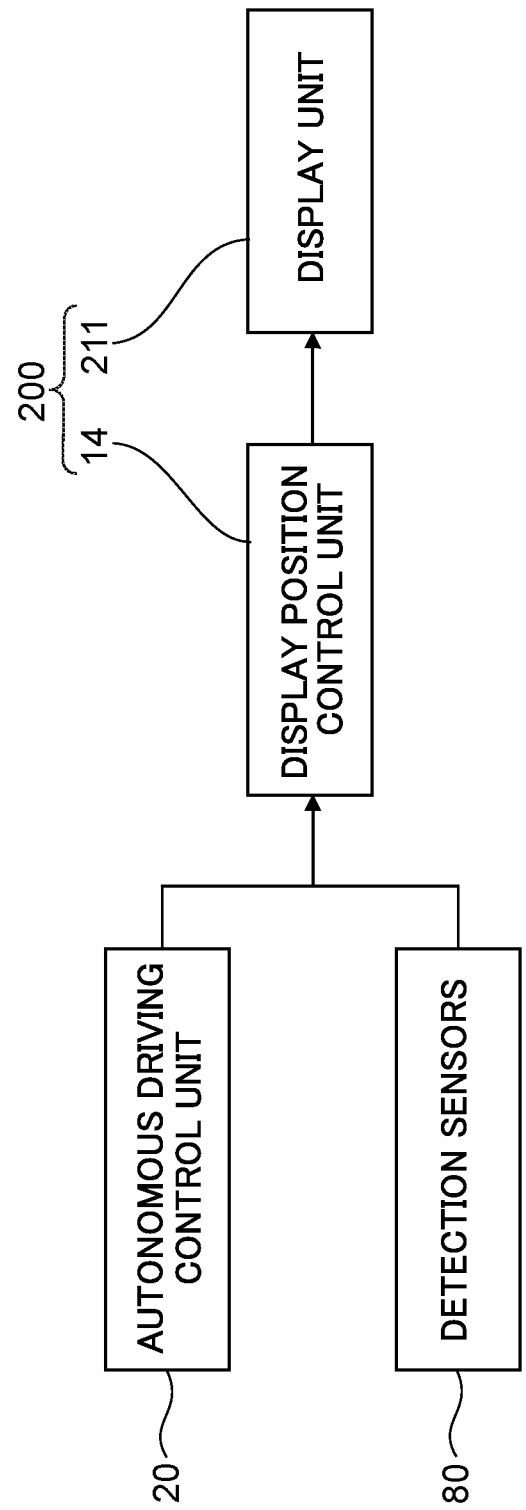
FIG. 7 is a block diagram showing a control system including a display position control unit of the display apparatus for a vehicle according to the second exemplary embodiment.

As shown in FIG. 7, the display apparatus for a vehicle 200 according to the second exemplary embodiment includes a display unit 211 and the display position control unit 14. The display unit 211 is formed with a single display 212 (see FIG. 8). Similarly to the display 12 of the display apparatus for a vehicle 10, the display 212 is a display screen that displays object information and, as shown in FIG. 6, is disposed at the instrument panel 104.

Figure 8:
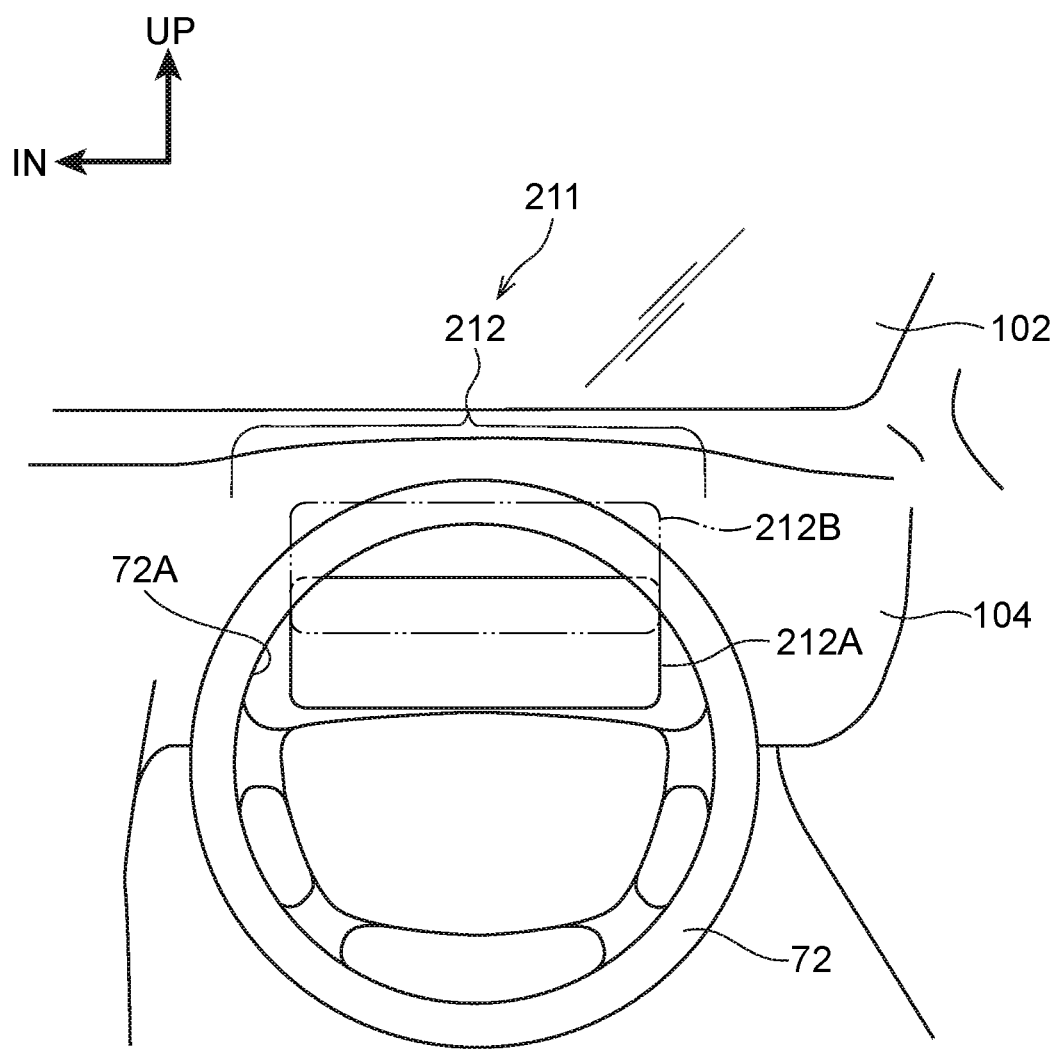
FIG. 8 is a diagram showing structures of a vehicle front portion according to the second exemplary embodiment as seen by a driver in the driving posture in the manual driving state.

Unlike the display 12, the display 212 does not need to be disposed over a range extending to the vehicle width direction inner side relative to the steering wheel 72. As shown in FIG. 8, it is sufficient if the display 212 is disposed at least in a range at the front side relative to the steering wheel 72. The display 212 is capable of displaying object information in a wheel interior region 212A and in an upper side region 212B. The wheel interior region 212A is disposed at a display position, at the front side relative to the steering wheel 72, that displays via a space 72A at the inside of the steering wheel 72. The upper side region 212B is disposed at the upper side relative to the wheel interior region 212A. That is, the display 212 includes the wheel interior region 212A and the upper side region 212B as display regions that display object information.

As shown in FIG. 6 and FIG. 8, in specific terms the wheel interior region 212A displays through the space 72A of the steering wheel 72 to the driver H1 in the driving posture in the manual driving state. That is, as shown in FIG. 8, the wheel interior region 212A is disposed at the inside of the steering wheel 72 (in the space 72A) as seen by the driver H1. Thus, the driver H1 can see object information displayed in the wheel interior region 212A via the space 72A of the steering wheel 72.

Figure 9:
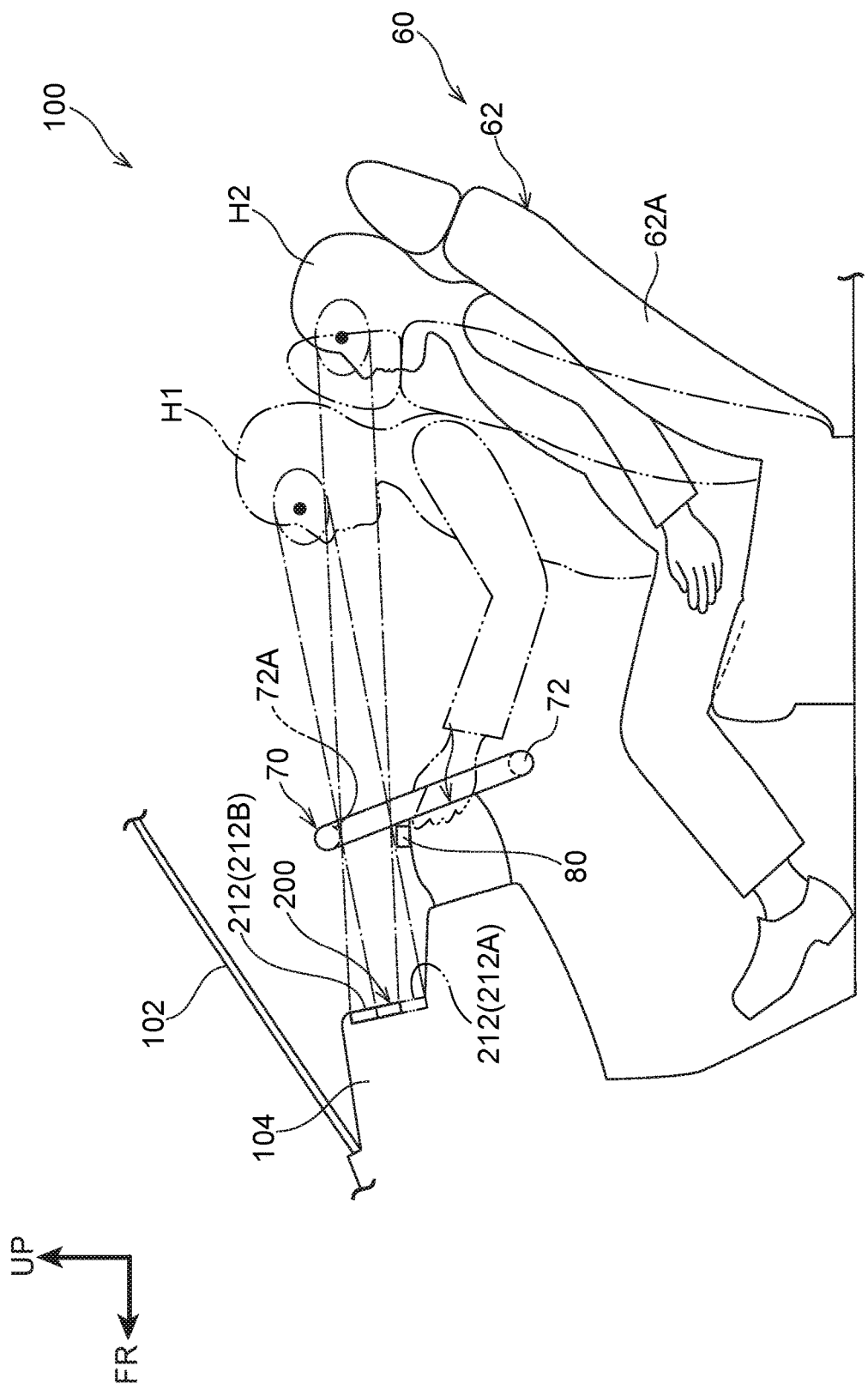
FIG. 9 is a schematic side view showing the structures shown in FIG. 6 when a driver has changed to the relaxed posture in the autonomous driving state.
Figure 10:
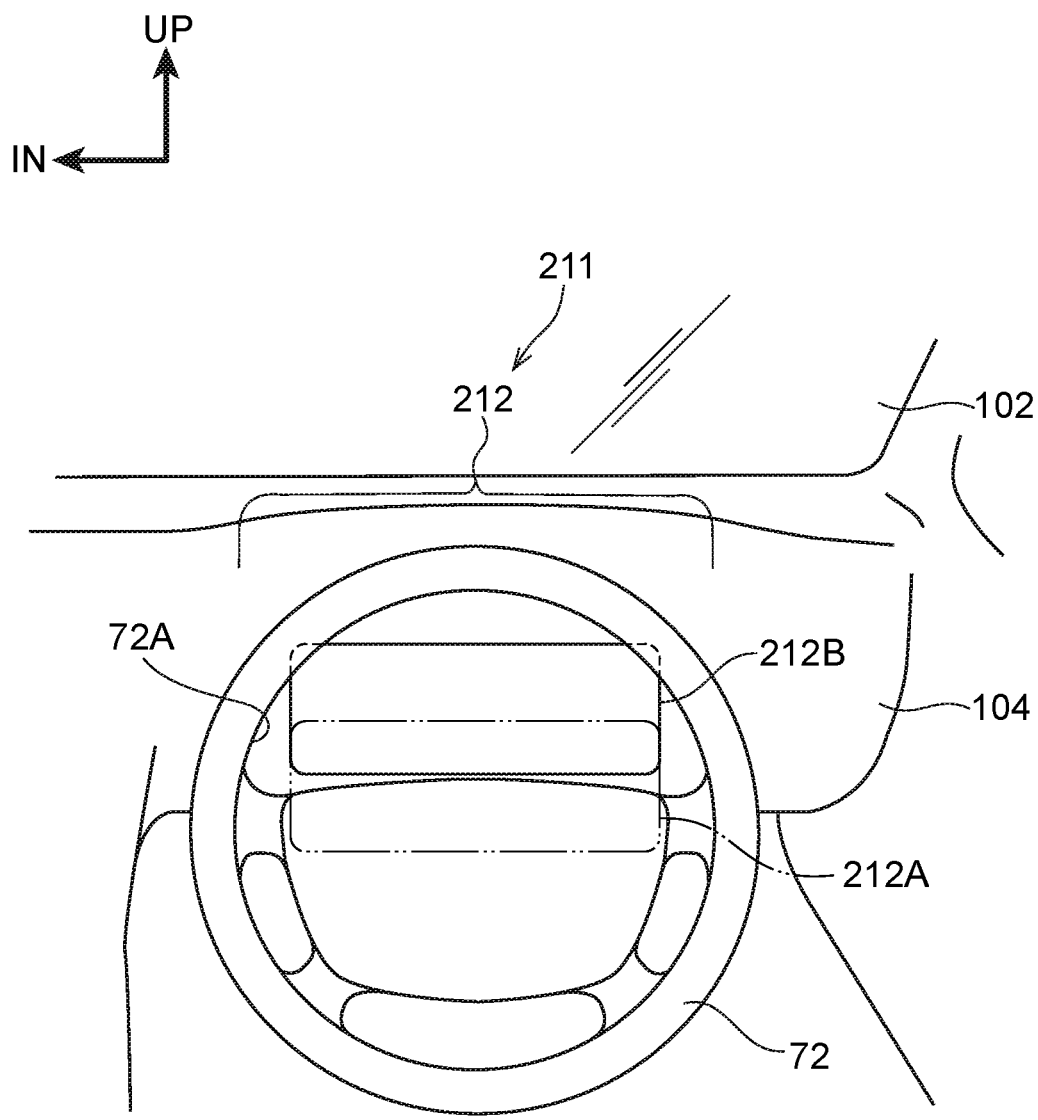
FIG. 10 is a diagram showing the structures of the vehicle front portion according to the second exemplary embodiment as seen by a driver in the relaxed posture in the autonomous driving state.

As shown in FIG. 9 and FIG. 10, in specific terms the upper side region 212B is disposed at a display position that displays through the space 72A of the steering wheel 72 to the driver H2 in the relaxed posture in the autonomous driving state. That is, as shown in FIG. 10, the upper side region 212B is disposed at the inside of the steering wheel 72 (in the space 72A) as seen by the driver H2. Thus, the driver H2 can see object information displayed in the upper side region 212B via the space 72A of the steering wheel 72. Therefore, the upper side region 212B is a display region that is disposed at a display position that is visible to the driver H2 rather than being obscured by the steering wheel 72 as seen by the driver H2. A lower portion of the upper side region 212B overlaps with an upper portion of the wheel interior region 212A.

The display position control unit 14 features a function that controls the display position of the object information by switching the display region in which the object information is displayed between the wheel interior region 212A and the upper side region 212B. The display position control unit 14 holds information on display positions of the object information displayed at the wheel interior region 212A and the upper side region 212B.

When the running operation state information of the vehicle 100 that is inputted from the autonomous driving control unit 20 represents the manual driving state, the display position control unit 14 displays the object information in the wheel interior region 212A (see FIG. 8).

Processing Sequence of the Display Position Control Unit 14 According to the Second Exemplary Embodiment The present processing sequence is executed when the running operation state of the vehicle 100 goes into the autonomous driving state. That is, the display position control unit 14 executes the present processing sequence when the running operation state information of the vehicle 100 that is inputted from the autonomous driving control unit 20 represents the autonomous driving state.

When the information representing the autonomous driving state is inputted from the autonomous driving control unit 20, the display position control unit 14 acquires position information of the steering wheel 72 and eye position information of the driver H2 from the position detection sensors 80.

On the basis of display position information of the wheel interior region 212A that is already known, the position information of the steering wheel 72 acquired from the position detection sensors 80, and the eye position information of the driver H2, the display position control unit 14 makes a determination as to whether the object information is obscured by the steering wheel 72 as seen by the driver H2. The display position control unit 14 determines that the object information is obscured by the steering wheel 72 even if only a portion of the object information is obscured by the steering wheel 72. The display position control unit 14 may determine that the object information is obscured by the steering wheel 72 if principal components of the object information (components that are vital to information transfer to the driver) are obscured.

Hence, if it is determined that the object information is obscured by the steering wheel 72, the display position control unit 14 switches the display region from the wheel interior region 212A to the upper side region 212B (see FIG. 9 and FIG. 10). As a result, the object information is displayed at a display position that is visible to the driver H2.

If the display position control unit 14 determines that the object information is not obscured by the steering wheel 72, the display position control unit 14 keeps the display region at the wheel interior region 212A.

Operational Effects According to the Second Exemplary Embodiment

According to the display apparatus for a vehicle 200 as described above, when the display position control unit 14 determines that object information displayed at the wheel interior region 212A is obscured by the steering wheel 72 as seen by the driver H2, the object information is caused to be displayed at the upper side region 212B that is disposed at a display position that is visible to the driver H2.

Therefore, visibility of the displayed object information may be assured. Because the visibility is assured by altering the display position at which the object information is displayed, there is no need to lower the steering wheel 72. Thus, a gap between the steering wheel 72 and the legs of the driver H2 may be assured.

Therefore, according to the configuration of the present exemplary embodiment, both assurance of the gap between the steering wheel 72 and the legs of the driver H2 and assurance of the visibility of displayed object information may be achieved.

Moreover, as described above, when it is determined that the displayed object information is obscured by the steering wheel 72, the display region 212B at which the object information is displayed after the alteration of the display region is disposed at the vehicle upper side relative to the wheel interior region 212A at which the object information is displayed before the alteration. Thus, the wheel interior region 212A before the alteration and the upper side region 212B after the alteration may be specified within a range that is small in the vehicle width direction. Therefore, the size of the display 212 in the vehicle width direction may be reduced.

Variant Examples of the Second Exemplary Embodiment

When it is determined that the displayed object information is obscured by the steering wheel 72, the display region at which the object information is displayed after the alteration is not limited to the upper side region 212B. It is sufficient that the display region be disposed at a display position that is visible to the driver H2. States in which the object information is visible to the driver H2 are ideally states in which the whole of the object information is visible, but may include states in which components of the object information other than principal components (i.e., components that do not contribute to information transfer to the driver) may not be visible. Further, states in which the object information is visible to the driver H2 may be understood as being states in which the object information is more visible than in states in which the object information is obscured by the steering wheel 72.

The display unit 211 is not limited to a display unit that displays at pre-specified display positions of the display 212. The display unit 211 may be a display unit that is capable of display at any position of the display 212, with the display position in the display 212 being freely alterable. In this display unit, when it is determined that the displayed object information is obscured by the steering wheel 72, the display position (display region) at which the object information is displayed after the alteration may be specified at each time of this determination. That is, a configuration is possible in which the display position (display region) after the alteration is modified at each occasion of the determination (a modifiable configuration).

The present invention is not limited by the exemplary embodiments described above; numerous modifications, alterations and improvements are possible within a technical scope not departing from the gist of the invention.

What is claimed is:

1. A display apparatus for a vehicle, comprising:
   a display unit capable of displaying information at a plurality of different display positions; and
   a display position control unit that, in an autonomous driving state of the vehicle, detects a position of a steering wheel and an eye position of a driver, and when the display position control unit determines that information displayed by the display unit is obscured by the steering wheel as seen by the driver, causes the information to be displayed at a display position that is visible to the driver.

2. The display apparatus for a vehicle according to claim 1, wherein, when the display position control unit determines that information displayed at a display position that is at the vehicle front side relative to the steering wheel is obscured by the steering wheel as seen by the driver, the display position control unit causes the information to be displayed at a display position that is at a vehicle width direction inner side or outer side relative to the steering wheel as seen by the driver.

3. The display apparatus for a vehicle according to claim 1, wherein, when the display position control unit determines that information displayed at a display position that displays via a space inside the steering wheel is obscured by the steering wheel as seen by the driver, the display position control unit causes the information to be displayed at another display position that is disposed at a vehicle upper side relative to the display position and that is visible to the driver via the space.

4. The display apparatus for a vehicle according to claim 1, wherein the display unit is capable of display at a plurality of display screens disposed at different positions.

5. The display apparatus for a vehicle according to claim 1, wherein the display unit is capable of display at a plurality of different display positions in one display screen.

6. The display apparatus for a vehicle according to claim 5, wherein the display unit is capable of display at a plurality of pre-specified display positions in the one display screen.

7. The display apparatus for a vehicle according to claim 5, wherein the display position is freely alterable within the one display screen and the display unit is capable of display at any position in the one display screen.

8. The display apparatus for a vehicle according to claim 1, wherein a determination that information displayed by the display unit is obscured by the steering wheel as seen by the driver includes a determination that a portion of information displayed in a display region is obscured by the steering wheel.

* * * * *